US011215978B2

(12) United States Patent
Dong (10) Patent No.: US 11,215,978 B2
(45) Date of Patent: Jan. 4, 2022

(54) AUTOMATED WAREHOUSING SYSTEM, DISPLAY PANEL PRODUCTION LINE AND LOGISTICS DELIVERY METHOD

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Xiang Dong, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 126 days.

(21) Appl. No.: 16/073,681

(22) PCT Filed: Dec. 18, 2017

(86) PCT No.: PCT/CN2017/116853
§ 371 (c)(1),
(2) Date: Jul. 27, 2018

(87) PCT Pub. No.: WO2018/205621
PCT Pub. Date: Nov. 15, 2018

(65) Prior Publication Data
US 2021/0208577 A1 Jul. 8, 2021

(30) Foreign Application Priority Data

May 12, 2017 (CN) .......................... 201710333399.9

(51) Int. Cl.
*G05B 19/418* (2006.01)
*G05B 19/4155* (2006.01)

(52) U.S. Cl.
CPC ... *G05B 19/41895* (2013.01); *G05B 19/4155* (2013.01); *G05B 19/4183* (2013.01);
(Continued)

(58) Field of Classification Search
CPC .......... G05B 19/41895; G05B 19/4183; G05B 19/4155; G05B 19/41875; G05B 2219/32015
See application file for complete search history.

(56) References Cited

U.S. PATENT DOCUMENTS 4,532,970 A 8/1985 Tullis et al.
2005/0075753 A1 4/2005 Chang et al.
(Continued)

FOREIGN PATENT DOCUMENTS

CN 1603066 A 4/2005
CN 1672068 A 9/2005
(Continued)

OTHER PUBLICATIONS

Y. J. Jang and G. Choi, "Introduction to Automated Material Handling Systems in LCD Panel Production Lines," 2006 IEEE International Conference on Automation Science and Engineering, 2006, pp. 223-229 (Year: 2006).*
(Continued)

*Primary Examiner* — Christopher E. Everett
(74) *Attorney, Agent, or Firm* — Brooks Kushman P.C.

(57) ABSTRACT

The present disclosure provides an automated warehousing system, a display panel production line and a logistics delivery method. The automated warehousing system includes a plurality of zones, a server host, a controller, and at least one moving device. Each zone corresponds to one manufacturing process for an in-process product. The server host is configured to manage production information of the in-process product and send the production information to
(Continued)

the controller. The controller is configured to, based on the received production information, after completion of one corresponding manufacturing process, control the moving device to move the in-process product to the zone that corresponds to the next manufacturing process to be performed at the in-process product.

14 Claims, 3 Drawing Sheets

(52) U.S. Cl.
CPC .............. G05B 19/41875 (2013.01); *G05B 2219/32015* (2013.01)

(56) References Cited

U.S. PATENT DOCUMENTS

| | | | |
|---|---|---|---|
| 2007/0198333 A1 | 8/2007 | Wang et al. | |
| 2007/0244594 A1* | 10/2007 | Chik | G05B 19/41895 700/112 |
| 2008/0051985 A1* | 2/2008 | D'Andrea | G05D 1/0212 701/410 |
| 2009/0238664 A1* | 9/2009 | Murata | H01L 21/67775 414/222.02 |
| 2011/0241845 A1* | 10/2011 | Sullivan | H01L 21/67294 340/10.42 |

FOREIGN PATENT DOCUMENTS

| | | |
|---|---|---|
| CN | 101414169 A | 4/2009 |
| CN | 101592943 A | 12/2009 |
| CN | 102233527 A | 11/2011 |
| CN | 105383850 A | 3/2016 |
| CN | 105775550 A | 7/2016 |
| CN | 106976676 A | 7/2017 |
| JP | 2001031221 A | 2/2001 |

OTHER PUBLICATIONS

First Office Action for Chinese Application No. 201710333399.9, dated Jul. 20, 2018, 7 Pages.
International Search Report and Written Opinion for Application No. PCT/CN2017/116853, dated Mar. 23, 2018, 11 Pages.

* cited by examiner

AUTOMATED WAREHOUSING SYSTEM, DISPLAY PANEL PRODUCTION LINE AND LOGISTICS DELIVERY METHOD

CROSS-REFERENCE TO RELATED APPLICATION APPLICATIONS

This application is the U.S. national phase of PCT Application No. PCT/CN2017/116853 filed on Dec. 18, 2017, which claims priority to Chinese Patent Application No. 201710333399.9 filed on May 12, 2017, which are incorporated herein by reference in their entireties.

TECHNICAL FIELD

The present applicant relates to the field of display technology, and in particular to an automated warehousing system, a display panel production line and a logistics delivery method.

BACKGROUND

In the related art, in high-generation (G8.5 and above) display panel manufacturing plant, an automated warehouse is longer in length. In the process of manufacturing display panels, management for carrying products in the automated warehouse, i.e., the process of moving the product to a next destination after a corresponding manufacturing process has been completed, only refers to management of carrying, and does not refer to management of storage, resulting in that the automated warehouse has a low efficiency for carrying, the process time is longer and then affects productivity of the production line.

SUMMARY

One embodiment of the present disclosure provides an automated warehousing system, applicable for a display panel production line. The automated warehousing system includes a plurality of zones, a server host, a controller, and at least one moving device. Each zone corresponds to one manufacturing process for an in-process product. Each zone is configured to store the in-process product that is to be processed under the manufacturing process corresponding to the each zone. The server host is configured to manage production information of the in-process product and send the production information to the controller. The controller is configured to, based on the received production information, after completion of one corresponding manufacturing process, control the moving device to move the in-process product to the zone that corresponds to the next manufacturing process to be performed at the in-process product.

In an optional embodiment, the above automated warehousing system provided in one embodiment of the present disclosure further includes at least one maintenance zone. The maintenance zone is configured to repair and/or maintain the moving device being shut down.

In an optional embodiment, in the above automated warehousing system provided in one embodiment of the present disclosure, the moving device is a transfer robot; and the transfer robot is configured to move the in-process product to corresponding zones.

In an optional embodiment, the transfer robot includes a programmable logic controller that is configured to receive a control signal from the controller.

In an optional embodiment, the controller includes a computer.

In an optional embodiment, the above automated warehousing system provided in one embodiment of the present disclosure includes a reader at an entrance of each zone. The reader is configured to identify identification information of the in-process product carried by the moving device.

In an optional embodiment, the reader includes a radio frequency identification sensor.

In an optional embodiment, the plurality of zones include a first row of zones and a second row of zones; the first row of zones and the second row of zones face each other and are spaced each other in a first direction. The first row of zones includes a coating zone, a black matrix fabrication zone, a color film fabrication zone, a protection layer fabrication zone and a spacer fabrication zone which are disposed sequentially along a second direction. The second row of zones includes a black matrix repairing zone, a color film repairing zone and a final repairing zone which are disposed sequentially along the second direction. The black matrix fabrication zone faces the black matrix repairing zone in the first direction; the color film fabrication zone faces the color film repairing zone in the first direction; the protection layer fabrication zone and the spacer fabrication zone face the final repairing zone in the first direction.

One embodiment of the present disclosure provides a display panel production line that includes the above automated warehousing system and a plurality of manufacturing process stations for manufacturing display panels.

In an optional embodiment, in the display panel production line provided in one embodiment of the present disclosure, the production line is a production line for manufacturing color substrates in the display panels.

One embodiment of the present disclosure provides a logistics delivery method for the above automated warehousing system, and the method includes: managing production information of an in-process product; and according to the production information, after completion of one corresponding manufacturing process, moving the in-process product to a zone that corresponds to the next manufacturing process to be performed at the in-process product.

In an optional embodiment, in the above logistics delivery method provided in one embodiment of the present disclosure, the method further includes: controlling a transfer robot to enter a maintenance zone and shut down for repairing and/or maintenance.

In an optional embodiment, according to the production information, after completion of one corresponding manufacturing process, moving the in-process product to a zone that corresponds to the next manufacturing process to be performed at the in-process product, includes: according to the production information, after completion of one corresponding manufacturing process, using the controller of the automated warehousing system to control the moving device of the automated warehousing system to move the in-process product to the zone that corresponds to the next manufacturing process to be performed at the in-process product.

In an optional embodiment, the method further includes: when the in-process product passes through an entrance of a current zone, using a reader disposed at the entrance to identify identification information of the in-process product carried by the moving device; based on the identification information, determining whether the current zone is the zone that corresponds to the next manufacturing process to be performed at the in-process product; when determining that the current zone is the zone that corresponds to the next manufacturing process to be performed at the in-process product, the moving device continues to move the in-process product to the current zone; or when determining that the current zone is not the zone that corresponds to the next manufacturing process to be performed at the in-process product, the controller controls the moving device to move the in-process product from the current zone to the zone that corresponds to the next manufacturing process to be performed at the in-process product.

One embodiment of the present disclosure provides a logistics delivery method for the above display panel production line and the method includes: managing production information of an in-process product; processing the in-process product in accordance with production process of display panels; and moving the in-process product to the zone that corresponds to a next manufacturing process to be performed at the in-process product according to the production information, after completion of one manufacturing process.

DETAILED DESCRIPTION

Figure 1:
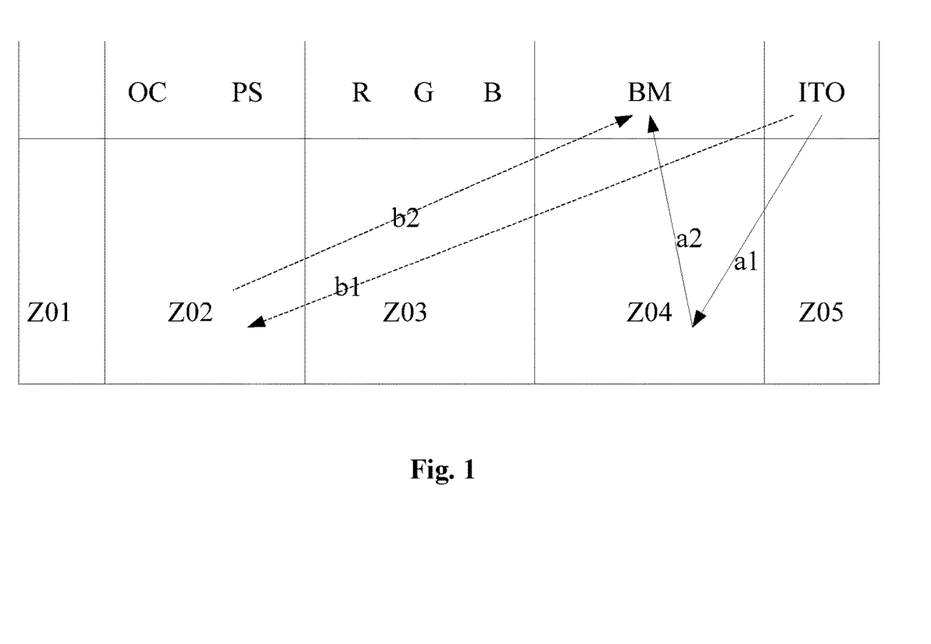
FIG. 1 is a schematic view of transportation paths in an automated warehouse in a processing of manufacturing color substrates in the related art.

At present, in-process products are stored randomly in an automated warehouse, i.e., the in-process products are temporarily stored at any places where are empty, which cannot ensure that a distance between a position for storing the in-process products and a next production process for the in-process products is the shortest. Particularly in a color substrate production line, there are a variety of manufacturing processes in an identical automated warehouse. The current manufacturing processes for manufacturing color substrates mainly include: cleaning a glass substrate-fabricating a transparent electrode ITO-fabricating a black matric BM-repairing the black matric-fabricating a color film RGB-repairing the color film-fabricating a protection layer OC-fabricating spacers PS-repairing the protection layer/spacers. For example, FIG. 1 shows distribution of the variety of manufacturing processes of the color substrates in the automated warehouse. According to the manufacturing processes, after completion of fabricating of the transparent electrode ITO, the next manufacturing process is to fabricate the black matrix BM, then it is the best to store the in-process products at Z04, and so on. For example, the in-process products can be moved along a path shown by arrows a1 and a2. If the in-process products are moved randomly, for example, the in-process products are moved along a path shown by arrows b1 and b2, the in-process products may be moved back and forth and moved across areas for several times in the automated warehouse due to random movements and storage of the in-process products. This seriously affects movement ability, movement time and utilization rate of a movement device, which may result in rapid wear of the movement device and reduce service life of the movement device. Further, in the manufacturing processes of the display panels, some steps of the manufacturing processes are stringent for time, for example, in order to prevent excessive drying, a display panel exposure production line is extremely strict for time required for exchanging the in-process products, and this requires higher movement efficiency for the in-process products in the manufacturing processes.

Thus, how to improve the movement efficiency of the automated warehousing system, thereby saving production time and increasing the production capacity of the production line, is a technical problem to be solved by those skilled in the art.

Embodiments of the present disclosure provide an automated warehousing system, a display panel production line and a logistics delivery method, which can improve movement efficiency of the automated warehousing system, thereby saving production time and increasing the production capacity of the production line.

Examples of the automated warehousing system, the display panel production line and the logistics delivery method provided in the embodiments of the present disclosure are described in details in conjunction with drawings.

Figure 2:
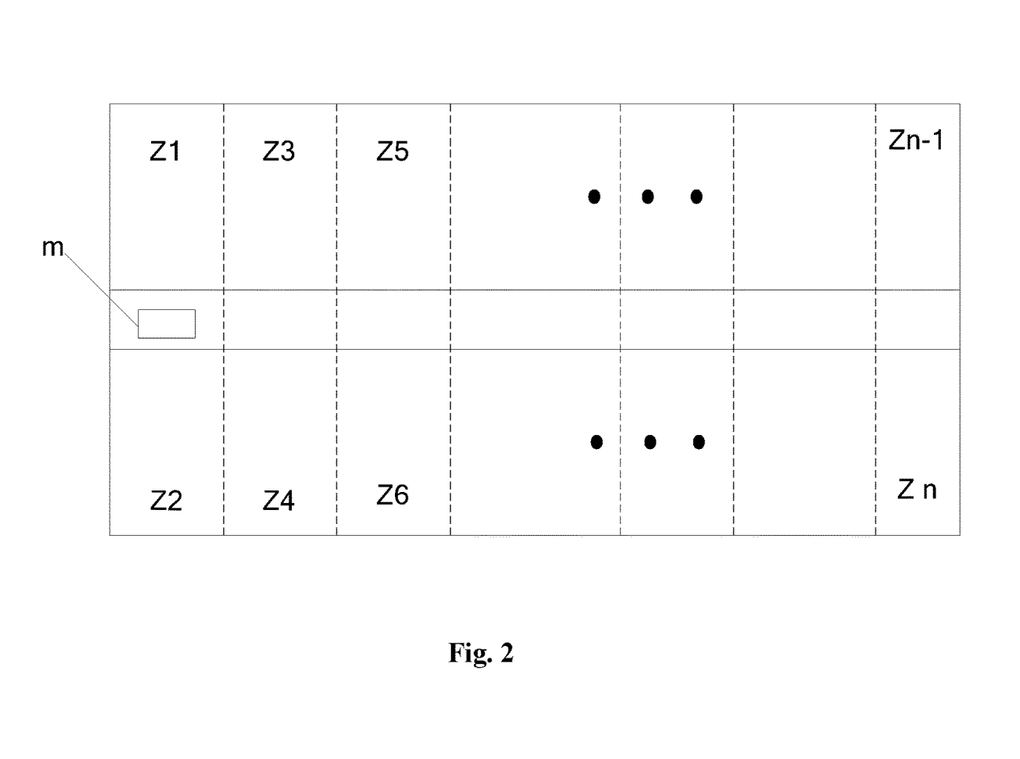
FIG. 2 is a schematic view of an automated warehousing system according to an embodiment of the present disclosure.
Figure 6:
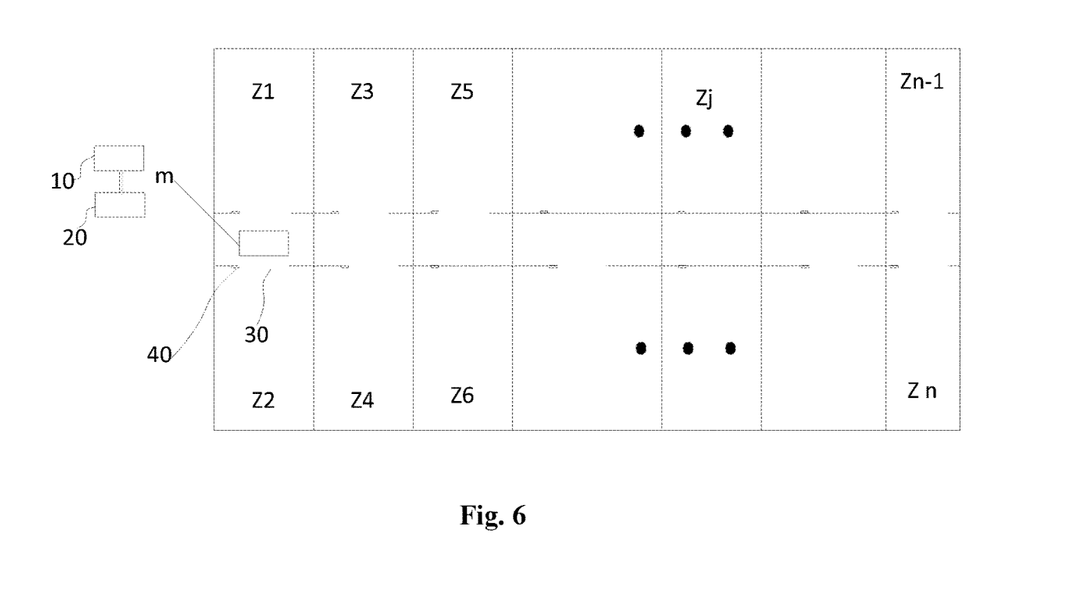
FIG. 6 is a schematic view of an automated warehousing system according to an embodiment of the present disclosure.

One embodiments of the present disclosure provides an automated warehousing system which is used for a display panel production line. As shown in FIG. 2, the automated warehousing system may include a plurality of zones $Z1 \sim Zn$, a server host 10 (as shown in FIG. 6), a controller 20 (as shown in FIG. 6), and at least one moving device m, where n is a integer greater than 1.

Each zone $Zj$ corresponds to one manufacturing process for the in-process products, where $Zj$ represents the j-th zone, and j is an integer which is greater than oe equal to 1 but less than n.

Each zone $Zj$ is used to store the in-process products that are to be processed under the manufacturing process corresponding to the zone $Zj$.

The server host 10 is used to manage production information of the in-process products, and send the production information to the controller 20.

The controller 20 is used to, based on the received production information, control the moving device m to move the in-process products to a next zone that corresponds to the manufacturing process to be performed at the in-process products after a corresponding manufacturing process has been completed. For example, in one embodiment, after the manufacturing process corresponding to the zone $Zx$ has been completed, the controller 20 is used to control the moving device m to move the in-process products from the zone $Zx$ to a next zone $Z(x+1)$ that corresponds to the manufacturing process to be performed at the in-process products, based on the received production information, where x is an integer which is greater than or equal to 1 and less than n.

In the above automated warehousing system provided in one embodiment of the present disclosure, the automated warehousing system is designed to have a plurality of zones each corresponds to one manufacturing process for the in-process products, thereby specifying an actual position of the in-process products within the automated warehousing system after completion of each manufacturing process and enabling the in-process products to be stored in the zone corresponding to the next manufacturing process to be carried. Thus, a zoning system in which a moving destination of the in-process products corresponds to a position where the next manufacturing process is to be carried, is established. In this way, the optimal delivery for the next manufacturing process can be realized, thereby solving problems in the high-generation display panel manufacturing plant that in-process products are stored randomly and moved disorderly because the length of the automated warehouse is longer and there are many manufacturing processes. Further, ineffective and redundant delivery of the in-process products in the automated warehouse can be effectively reduced, thereby reducing load of the movement device, improving utilization rate of the movement device, reducing wear and tear of the movement device, extending the service life of the movement device, and then finally improving the movement efficiency of the automated warehousing system, saving production time and increasing the production capacity of the production line.

In actual implementation, the above automated warehousing system provided in one embodiment of the present disclosure further includes at least one maintenance zone. The maintenance zone is used to shut down the moving device, repair and/or maintain the moving device. Specifically, in the automated warehousing system as shown in FIG. 2, the first zone Z1 and the last zone Zn may be planned as maintenance zones which are used to shut down the moving device, repair and/or maintain the moving device. In other words, the automated warehousing system is provided with the dedicated maintenance zone, and the moving device may be shut down for repairing and/or maintenance in the dedicated maintenance zone when the moving device is needed to be shut down for repairing and/or maintenance. Thus, daily maintenance and repair of the moving device can be ensured.

In actual implementation, in the above automated warehousing system, the moving device may be implemented as a transfer robot. The transfer robot may be used to transfer the in-process products to the corresponding zone.

In actual implementation, in the above automated warehousing system, as shown in FIG. 6, a reader 40 is disposed at an entrance 30 of each zone. The reader is used to read identification information of the in-process product carried by the moving device. Specifically, in the above automated warehousing system, the presence of the reader 40 at the entrance 30 of each zone can identify identification information of a cassette (CST), i.e., CST ID, where the cassette is for carrying the in-process product on the moving device. In this way, by obtaining the identification information of the in-process product through the reader, it can be further determined whether the in-process product is moved to the corresponding zone. The reader may be implemented as a radio frequency identification sensor. The radio frequency identification sensor reads information in a non-contact way, thereby improving efficiency of reading information. In actual application, the entrance of each zone may be set to a one-way entrance or a two-way entrance according to needs, and it is needed to ensured that the identification information can be read when the in-process product passes through the entrance 30 and that information flow is accurate and unique to prevent the in-process product from being manufactured under wrong manufacturing process or being moved to a wrong zone.

In actual implementation, in the above automated warehousing system, the reader is further used to send the identified identification information to the controller. Specifically, in the above automated warehousing system, when the reader obtains the identification information of the in-process product, the reader may further determine or judge whether the in-process product is moved to the correct corresponding zone. Meanwhile, the reader may send the identified identification information to the controller, and then the controller sends the identified identification information to server host, thereby completing information check and then ensuring correct movement of the in-process product. For example, when the in-process product enters into the entrance of the current zone, the reader disposed at the entrance identifies identification information of the in-process product carried by the moving device. Then, according to the identification information, the reader determines whether the current zone is the zone corresponding to the next manufacturing process to be performed at the in-process product. If it is determined that the current zone is the zone corresponding to the next manufacturing process to be performed at the in-process product, the moving device continues to move the in-process product to the current zone. If it is determined that the current zone is not the zone corresponding to the next manufacturing process to be performed at the in-process product, the controller controls the moving device to move the in-process product from the current zone to the zone corresponding to the next manufacturing process to be performed at the in-process product.

Based on the same idea, one embodiment of the present disclosure provides a display panel production line which includes the above automated warehousing system provided in one embodiment of the present disclosure and a plurality of manufacturing process stations for manufacturing display panels. Specifically, in the above display panel production line provided in one embodiment of the present disclosure, the above automated warehousing system is adopted to realize movement and storage of the in-process product along the manufacturing process stations. The server host of the automated warehousing system manages production information of the in-process product, and sends the production information to the controller, i.e., a computer of the automated warehousing system. The controller controls the moving device to move the in-process product. The moving device such as a transfer robot includes a programmable logic controller that is used to receive a control signal from the controller and perform specific movement operations. Each zone of the automated warehousing system corresponds to one manufacturing process for the in-process product; after completion of each manufacturing process, an actual position of the in-process products within the automated warehousing system is specified, thereby enabling the in-process products to be stored in the zone corresponding to the next manufacturing process to be carried. In this way, the optimal delivery for the next manufacturing process can be realized, thereby solving problems in the high-generation display panel manufacturing plant that in-process products are stored randomly and moved disorderly because the length of the automated warehouse is longer and there are many manufacturing processes. Further, ineffective and redundant delivery of the in-process products in the automated warehouse can be effectively reduced, thereby reducing load of the movement device, improving utilization rate of the movement device, reducing wear and tear of the movement device, extending the service life of the movement device, and then finally improving the movement efficiency of the automated warehousing system, saving production time and increasing the production capacity of the production line.

In actual implementation, the above display panel production line provided in one embodiment of the present disclosure may be a production line for manufacturing color substrates of display panels, or a production line for manufacturing array substrates or other components, which are not specifically limited. The above display panel production line provided in one embodiment of the present disclosure may be extended to various related fields and have extensive applicability.

Figure 3:
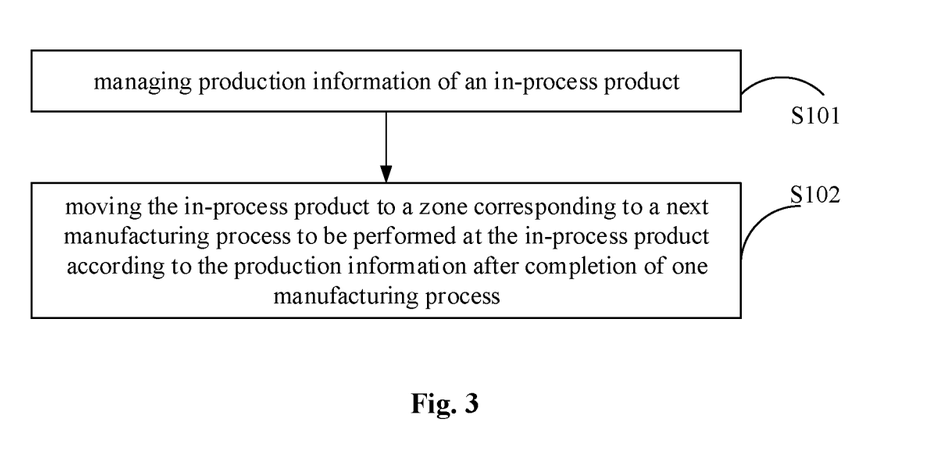
FIG. 3 is a flowchart of a logistics delivery method for the automated warehousing system according to an embodiment of the present disclosure.

Based on the same idea, one embodiment of the present disclosure provides a logistics delivery method for the above automated warehousing system. As shown in FIG. 3, the method may include: S101 of managing production information of an in-process product; and S102 of moving the in-process product to a zone corresponding to a next manufacturing process to be performed at the in-process product according to the production information after completion of one manufacturing process.

In the above logistics delivery method provided in one embodiment of the present application, a zoning system in which a moving destination of the in-process product corresponds to a position where the next manufacturing process is to be carried, is established. In this way, the optimal delivery for the next manufacturing process can be realized, thereby solving problems in the high-generation display panel manufacturing plant that in-process products are stored randomly and moved disorderly because the length of the automated warehouse is longer and there are many manufacturing processes. Further, ineffective and redundant delivery of the in-process products in the automated warehouse can be effectively reduced, thereby reducing load of the movement device, improving utilization rate of the movement device, reducing wear and tear of the movement device, extending the service life of the movement device, and then finally improving the movement efficiency of the automated warehousing system, saving production time and increasing the production capacity of the production line.

In actual implementation, the above logistics delivery method provided in one embodiment of the present application may further include: controlling the moving device such as a transfer robot to enter a maintenance zone and shut down for repairing and/or maintenance. Specifically, in order to ensure continuous movement of the automated warehousing system, several transfer robots may be provided for performing moving operations. Accordingly, a maintenance zone may be provided in the automated warehousing system for repairing and/or maintaining one or more of the transfer robots, thereby ensuring daily maintenance of the robots and normal operation of the production line.

Figure 4:
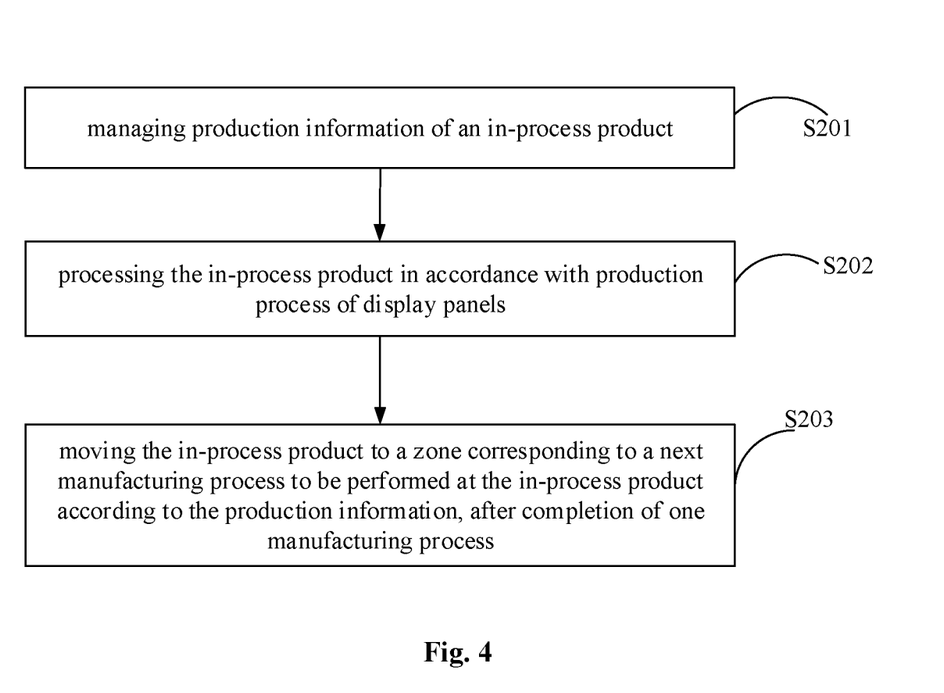
FIG. 4 is a flowchart of a logistics delivery method for a display panel production line according to an embodiment of the present disclosure.

Based on the same idea, one embodiment of the present disclosure provides a logistics delivery method for the above display panel production line. As shown in FIG. 4, the method may include: S201 of managing production information of an in-process product; S202 of processing the in-process product in accordance with production process of display panels; and S203 of moving the in-process product to a zone corresponding to a next manufacturing process to be performed at the in-process product according to the production information, after completion of one manufacturing process.

The above logistics delivery method for the production line provided in one embodiment is described in detail with the following example.

Figure 5:
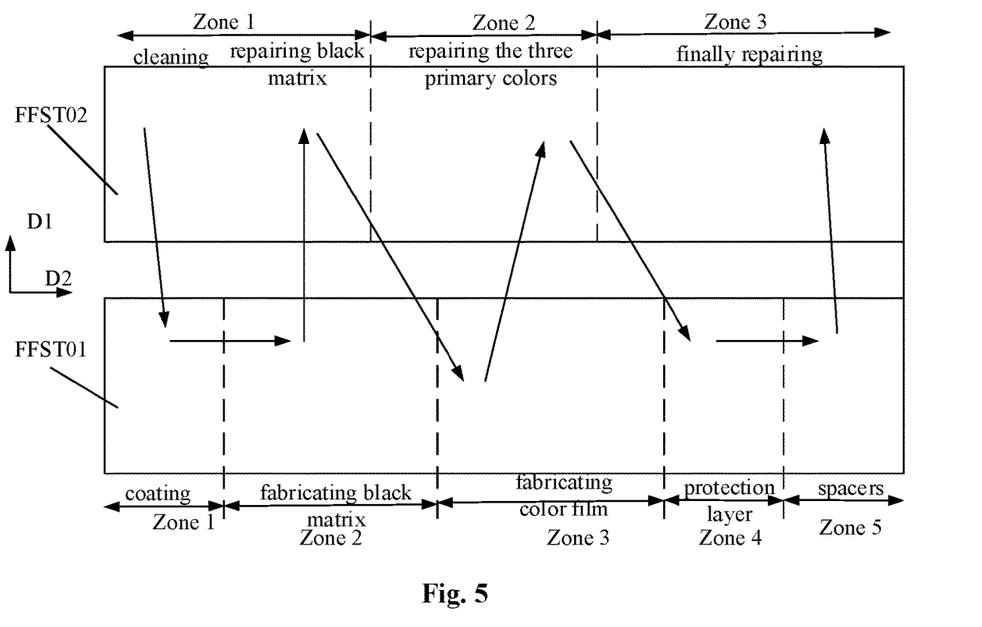
FIG. 5 is a schematic view of logistics delivery for a color substrate production line according to an embodiment of the present disclosure.

As shown in FIG. 5, taking a production process of a color film substrate as an example for description, the main production process includes: cleaning a glass substrate→coating a film→fabricating a black matrix→repairing the black matrix→fabricating three primary colors including red, blue and green→repairing the three primary colors including red, blue and green→fabricating a protection layer→fabricating spacers-finally repairing. The logistics delivery method for the production line includes:

1. after the glass substrate is put into the production line, the glass substrate is first cleaned in the zone 1 of an automated warehouse FFST02, and then the cleaned lass substrate is moved to a zone corresponding to the next manufacturing process, i.e., entering into a zone 1 of an automated warehouse FFST01 for coating;

2. after the coating is completed, the next manufacturing process is to manufacture a black matrix, then the in-process product is moved to the zone 2 of the automated warehouse FFST02 for completing of manufacturing of the black matrix;

3. after the manufacturing of the black matrix is completed, then the in-process product is moved to the zone 1 of the automated warehouse FFST02 for repairing the black matrix;

4. after completion of repairing of the black matrix, the in-process product is moved back to the zone 3 of the automated warehouse FFST01 for fabricating a color film, i.e., three primary colors including red, blue and green;

5. after completion of fabricating of the color film, the in-process product is moved to the zone 2 of the automated warehouse FFST02 for repairing the three primary colors including red, blue and green;

6. after completion of repairing of the three primary colors including red, blue and green, the in-process product is moved to the zone 4 of the automated warehouse FFST01 for fabricating a protection layer;

7. after completion of fabricating of the protection layer, the in-process product is moved to the zone 5 of the automated warehouse FFST01 for fabricating spacers;

8. after completion of fabricating of the spacers, the in-process product is moved to the zone 3 of the automated warehouse FFST02 for finally repairing.

The above logistics delivery method for the display panel production line provided in one embodiment is described in detail with the above example, and the logistics delivery method for the automated warehousing system is similar and is not specifically described.

The automated warehousing system, the production line and the logistics delivery method provided in embodiments of the present disclosure may be applied to the production line for manufacturing display panels. The automated warehousing system may include a plurality of zones, a server host, a controller and at least one moving device. Each zone corresponds to one manufacturing process for the in-process products. Each zone is used to store the in-process products that are to be processed under the manufacturing process corresponding to the zone. The server host is used to manage production information of the in-process products, and send the production information to the controller. The controller is used to, based on the received production information, control the moving device to move the in-process products to a next zone that corresponds to the manufacturing process to be performed at the in-process products after a corresponding manufacturing process has been completed. The automated warehousing system is designed to have a plurality of zones each corresponds to one manufacturing process for the in-process products, thereby specifying an actual position of the in-process products within the automated warehousing system after completion of each manufacturing process and enabling the in-process products to be stored in the zone corresponding to the next manufacturing process to be carried. Thus, a zoning system in which a moving destination of the in-process products corresponds to a position where the next manufacturing process is to be carried, is established. In this way, the optimal delivery for the next manufacturing process can be realized, thereby solving problems in the high-generation display panel manufacturing plant that in-process products are stored randomly and moved disorderly because the length of the automated warehouse is longer and there are many manufacturing processes. Further, ineffective and redundant delivery of the in-process products in the automated warehouse can be effectively reduced, thereby reducing load of the movement device, improving utilization rate of the movement device, reducing wear and tear of the movement device, extending the service life of the movement device, and then finally improving the movement efficiency of the automated warehousing system, saving production time and increasing the production capacity of the production line.

In addition, referring to FIG. 5, in one embodiment, the plurality of zones in the automated warehousing system includes a first row of zones and a second row of zones. The first row of zones and the second row of zones face each other and are spaced each other in a first direction D1. The first row of zones includes a coating zone (i.e., the zone 1 of FFST01 shown in FIG. 5), a black matrix fabrication zone (i.e., the zone 2 of FFST01 shown in FIG. 5), a color film fabrication zone (i.e., the zone 3 of FFST01 shown in FIG. 5), a protection layer fabrication zone (i.e., the zone 4 of FFST01 shown in FIG. 5) and a spacer fabrication zone (i.e., the zone 5 of FFST01 shown in FIG. 5) which are disposed sequentially along a second direction D2. The second row of zones includes a black matrix repairing zone (i.e., the zone 1 of FFST02 shown in FIG. 5), a color film repairing zone (i.e., the zone 2 of FFST02 shown in FIG. 5) and a final repairing zone (i.e., the zone 3 of FFST02 shown in FIG. 5) which are disposed sequentially along the second direction D2. The black matrix fabrication zone faces the black matrix repairing zone in the first direction D1. The color film fabrication zone faces the color film repairing zone in the first direction D1. The protection layer fabrication zone and the spacer fabrication zone face the final repairing zone in the first direction D1.

Apparently, a person skilled in the art may make improvements and modifications without departing from the principle of the present disclosure, and these improvements and modifications shall also fall within the scope of the present disclosure.

What is claimed is:

1. An automated warehousing system, applicable for a display panel production line, comprising a plurality of zones, a server host, a controller, and at least one moving device;
    wherein each zone of the plurality of zones corresponds to one manufacturing process for an in-process product;
    each zone of the plurality of zones is configured to store the in-process product that is to be processed under the manufacturing process corresponding to each zone of the plurality of zones;
    the server host is configured to manage production information of the in-process product and send the production information to the controller; and
    the controller is configured to, based on the received production information, after completion of one corresponding manufacturing process, control the moving device to move the in-process product to a zone that corresponds to the next manufacturing process to be performed at the in-process product;
    wherein the plurality of zones include a first row of zones and a second row of zones; a front of each zone of the first row of zones and a front of each zone of the second row of zones face each other and the first row of zones and the second row of zones are spaced each other in a first direction;
    the first row of zones includes a coating zone, a black matrix fabrication zone, a color film fabrication zone, a protection layer fabrication zone and a spacer fabrication zone which are disposed sequentially along a second direction;
    the second row of zones includes a black matrix repairing zone, a color film repairing zone and a final repairing zone which are disposed sequentially along the second direction;
    wherein a front of the black matrix fabrication zone faces a front of the black matrix repairing zone in the first direction; a front of the color film fabrication zone faces a front of the color film repairing zone in the first direction; a front of the protection layer fabrication zone and a front of the spacer fabrication zone face a front of the final repairing zone in the first direction.

2. The automated warehousing system of claim 1, further comprising: at least one maintenance zone; wherein the maintenance zone is configured to repair and/or maintain the moving device being shut down.

3. The automated warehousing system of claim 1, wherein the moving device is a transfer robot; and the transfer robot is configured to move the in-process product to corresponding zones.

4. The automated warehousing system of claim 3, wherein the transfer robot includes a programmable logic controller that is configured to receive a control signal from the controller.

5. The automated warehousing system of claim 1, wherein the controller includes a computer.

6. The automated warehousing system of claim 1, further comprising a reader at an entrance of each zone of the plurality of zones;
    wherein the reader is configured to identify identification information of the in-process product carried by the moving device.

7. The automated warehousing system of claim 6, wherein the reader includes a radio frequency identification sensor.

8. A display panel production line comprising: the automated warehousing system of claim 1, and a plurality of manufacturing process stations for manufacturing display panels.

9. The production line of claim 8, wherein the production line is a production line for manufacturing color substrates in the display panels.

10. A logistics delivery method for the display panel production line of claim 8, comprising:
    managing production information of an in-process product;
    processing the in-process product in accordance with production process of display panels; and
    moving the in-process product to the zone that corresponds to a next manufacturing process to be performed at the in-process product according to the production information, after completion of one manufacturing process.

11. A logistics delivery method for the automated warehousing system of claim 1, comprising:
    managing production information of an in-process product; and
    according to the production information, after completion of one corresponding manufacturing process, moving the in-process product to a zone that corresponds to the next manufacturing process to be performed at the in-process product.

12. The method of claim 11, further comprising:
controlling a transfer robot to enter a maintenance zone and shut down for repairing and/or maintenance.

13. The method of claim 11, wherein according to the production information, after completion of one corresponding manufacturing process, moving the in-process product to a zone that corresponds to the next manufacturing process to be performed at the in-process product, includes:
according to the production information, after completion of one corresponding manufacturing process, using the controller of the automated warehousing system to control the moving device of the automated warehousing system to move the in-process product to the zone that corresponds to the next manufacturing process to be performed at the in-process product.

14. The method of claim 13, further comprising:
when the in-process product passes through an entrance of a current zone, using a reader disposed at the entrance to identify identification information of the in-process product carried by the moving device;

based on the identification information, determining whether the current zone is the zone that corresponds to the next manufacturing process to be performed at the in-process product;

when determining that the current zone is the zone that corresponds to the next manufacturing process to be performed at the in-process product, the moving device continues to move the in-process product to the current zone; or when determining that the current zone is not the zone that corresponds to the next manufacturing process to be performed at the in-process product, the controller controls the moving device to move the in-process product from the current zone to the zone that corresponds to the next manufacturing process to be performed at the in-process product.

* * * * *